(12) United States Patent
Flajslik et al.

(10) Patent No.: US 10,305,805 B2
(45) Date of Patent: May 28, 2019

(54) TECHNOLOGIES FOR ADAPTIVE ROUTING USING AGGREGATED CONGESTION INFORMATION

(71) Applicant: Intel Corporation, Santa Clara, CA (US)

(72) Inventors: Mario Flajslik, Hudson, MA (US); Eric R. Borch, Fort Collins, CO (US); Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 15/200,442

(22) Filed: Jul. 1, 2016

(65) Prior Publication Data
US 2018/0006950 A1 Jan. 4, 2018

(51) Int. Cl.
*H04L 12/803* (2013.01)
*H04L 12/801* (2013.01)
*H04L 12/835* (2013.01)

(52) U.S. Cl.
CPC ............ *H04L 47/125* (2013.01); *H04L 47/11* (2013.01); *H04L 47/30* (2013.01)

(58) Field of Classification Search
CPC ......... H04L 47/10; H04L 47/30; H04L 47/12; H04L 47/125; H04L 47/11
See application file for complete search history.

(56) References Cited

U.S. PATENT DOCUMENTS

| 6,009,078 | A | * | 12/1999 | Sato | H04L 12/1886 370/232 |
| 6,192,422 | B1 | * | 2/2001 | Daines | H04L 12/46 709/232 |
| 7,120,117 | B1 | * | 10/2006 | Liu | H04L 49/253 370/236 |
| 2012/0033550 | A1 | * | 2/2012 | Yano | H04L 47/10 370/230 |
| 2012/0134260 | A1 | * | 5/2012 | Chou | H04L 43/065 370/225 |
| 2016/0173383 | A1 | * | 6/2016 | Liu | H04L 47/30 370/235 |
| 2017/0187597 | A1 | * | 6/2017 | Nolan | H04L 43/062 |

* cited by examiner

*Primary Examiner* — Will W Lin
(74) *Attorney, Agent, or Firm* — Barnes & Thornburg LLP (57) ABSTRACT

Technologies for adaptive routing based on aggregated congestion information include a network switch that includes a plurality of output ports. The network switch is configured to determine a maximum local occupancy count for each output port based on a maximum local occupancy count of output buffer queues of each output port, a local congestion value based on the maximum local occupancy count, and a remote congestion value for a corresponding remote input buffer queue of a remote computing device communicatively coupled to a corresponding output port. The network switch is further configured to determine, for each output port, a total congestion value as a function of the local congestion value and the remote congestion value and enqueue the network packet into one of the output buffer queues of one of the output ports based on the total congestion values of the output ports. Other embodiments are described herein.

25 Claims, 5 Drawing Sheets

TECHNOLOGIES FOR ADAPTIVE ROUTING USING AGGREGATED CONGESTION INFORMATION

GOVERNMENT RIGHTS CLAUSE

This invention was made with Government support under contract number H98230B-11-0011-0102 awarded by the Department of Defense. The Government has certain rights in this invention.

BACKGROUND

Modern computing devices have become ubiquitous tools for personal, business, and social uses. As such, many modern computing devices are capable of connecting to various data networks, including the Internet and corporate intranets, to transmit and receive data communications over the various data networks at varying rates of speed. To facilitate communications between computing devices (e.g., endpoint computing nodes), the data networks typically include one or more network computing nodes (e.g., compute servers, storage servers, etc.) to route communications (e.g., via network switches, network routers, etc.) that enter/exit a network (e.g., north-south network traffic) and between network computing nodes in the network (e.g., east-west network traffic).

Certain network infrastructures, such as data centers, may include tens of thousands or more of such network computing nodes and traffic forwarding devices. To handle such large network infrastructures, adaptive routing technologies have evolved using topology information of the network infrastructure. Traditional methods to determine the topology of the network infrastructure may include one or more of the computing nodes identifying neighboring computing nodes (e.g., those computing nodes that are one hop from the identifying computing node) using static topology information, which cannot typically be applied to the adaptive routing technologies.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
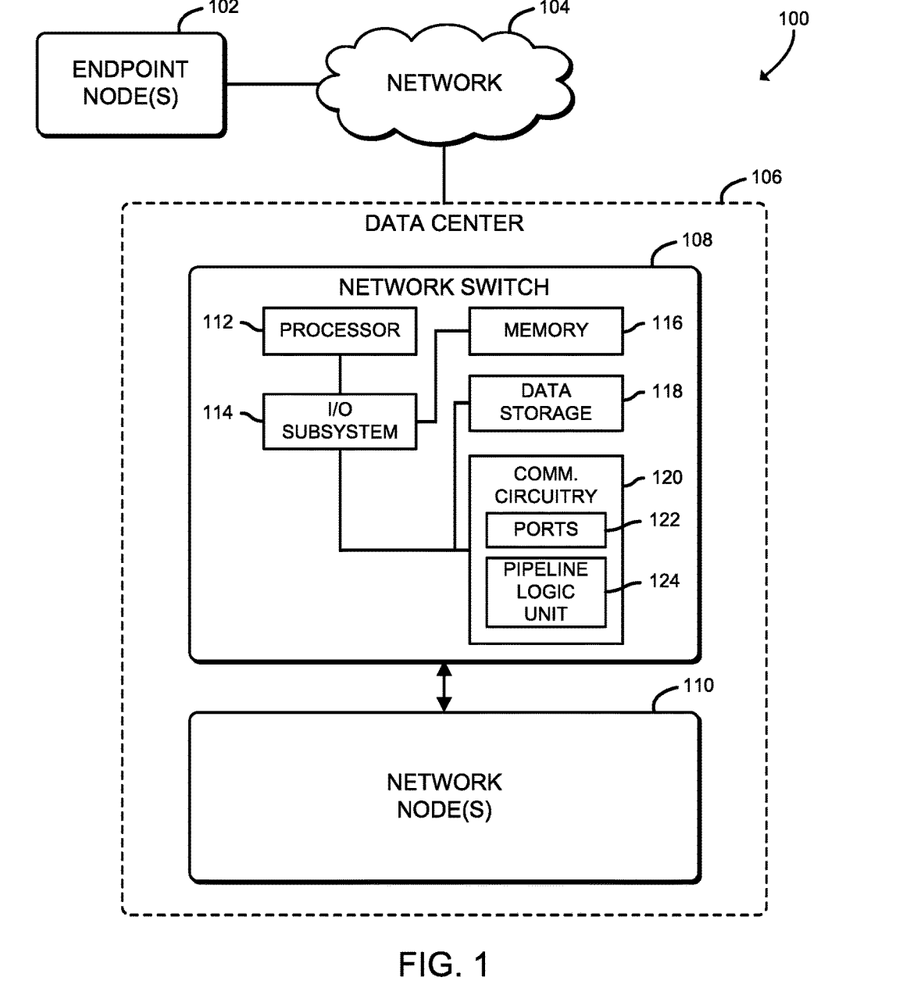
FIG. 1 is a simplified block diagram of at least one embodiment of a system for adaptive routing based on aggregated congestion information that includes a network switch.

Referring now to FIG. 1, an illustrative system 100 for adaptive routing based on aggregated congestion information includes one or more endpoint nodes 102 communicatively coupled to an illustrative data center 106 via a network 104. The illustrative data center 106 includes a network switch 108 communicatively coupled to one or more network nodes 110 (e.g., one or more compute nodes, one or more storage nodes, a pool of compute/storage resources, etc.) in a switching fabric network topology. In use, the network switch 108 manages the ingress and egress of network traffic to and from the network nodes 110 to which the network switch 108 is connected. Generally, upon receiving a network packet at an input port of the network switch 108, the network switch 108 internally routes the received network packet to an output port of the network switch 108 based on which output port is in an applicable path (e.g., a minimal path or a non-minimal path) usable to forward the network packet to a destination computing device. The applicable path may be determined based at least in part on information of the received network packet, such as a workload type, a destination address (e.g., an internet protocol (IP) address, a destination media access control (MAC) address), 5-tuple flow identification, etc. Further, in some embodiments, the network switch 108 is configured to determine present conditions of the data center 106 network and dynamically route (i.e., adaptively route) received network packets based on the present conditions, such as by using congestion-based adaptive routing technologies.

Unlike present congestion-based adaptive routing based technologies that combine multiple output buffer queues of a single output port into a single congestion value (i.e., treat multiple output buffer queues as a single buffer queue) and count all of the elements in the single queue to determine the applicable output port for a received network packet, the network switch 108 is configured to determine the applicable output port for a received network packet based on a congestion value determined from a maximum number of elements in each output buffer queue. To do so, as will be described in detail below, the network switch 108 aggregates output buffer queue congestion information of the output buffers queues (see, e.g., the output buffer queues 500 of FIGS. 5 and 6) for each output buffer of the output ports of the network switch 108 (see, e.g., the output buffers of the output ports 214 of the illustrative network switch 108 of FIG. 2) to choose the appropriate output port for each network packet. It should be appreciated that the elements in each buffer queue may represent at least a portion of a network packet (e.g., a flow control digit (flit), a header, a payload, etc.) that may be packetized prior to transmission to the network switch 108.

The endpoint nodes 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system.

The network 104 may be embodied as any type of wired and/or wireless communication network, including a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other network computing devices (e.g., virtual and/or physical routers, switches, network hubs, servers, storage devices, compute devices, etc.), as needed to facilitate communications between the endpoint nodes 102 and the data center 106, as well as networking devices between data centers 106, which are not shown to preserve clarity of the description.

Similarly, the data center 106 may include various network computing devices (e.g., virtual and/or physical routers, switches, network hubs, servers, storage devices, compute devices, etc.) as well as associated interconnects (e.g., interconnection switches, access switches, port extenders, etc.), switch management software, and/or data cables usable to provide a system of interconnects between the network computing devices (e.g., the network switch 108 and the network nodes 110), such as may be found in the data center 106 (e.g., in an HPC fabric), to provide low-latency and high-bandwidth communication between any two points in the data center 106.

The network switch 108 may be embodied as any type of switch, such as a disaggregated switch, a rack-mounted switch, a standalone switch, a fully managed switch, a partially managed switch, a full-duplex switch, and/or a half-duplex communication mode enabled switch. The network switch 108 may be positioned as a top-of-rack (ToR) switch, an end-or-rack (EoR) switch, a middle-of-rack (MoR) switch, or any position in which the network switch 108 may perform the functions described herein. For example, in some embodiments, the network switch 108 may be configured as a managed smart switch that includes a set of management features, such as may be required for the network switch 108 to perform the functions as described herein.

While the network switch 108 is illustratively embodied as a switch, in other embodiments the network switch may be embodied any type of network computing device (e.g., network traffic managing, processing, and/or forwarding device) capable of performing the functions described herein, such as, without limitation, a disaggregated router, an enhanced network interface controller (NIC) (e.g., a host fabric interface (HFI)), a server (e.g., stand-alone, rack-mounted, blade, etc.), a network appliance (e.g., physical or virtual), a web appliance, a distributed computing system, a processor-based system, and/or a multiprocessor system. It should be appreciated that while the illustrative network system 100 includes only includes a single network switch 108, there may be any number of additional network switches 108, as well any number of additional network nodes 110, in other embodiments.

As shown in FIG. 1, the illustrative network switch 108 includes a processor 112, an input/output (I/O) subsystem 114, a memory 116, a data storage device 118, and communication circuitry 120. Of course, the network switch 108 may include fewer or other or additional components, such as those commonly found in a network computing device, in other embodiments. Additionally, in some embodiments, one or more of the illustrative components may be incorporated in, or otherwise form a portion of, another component. For example, the memory 116, or portions thereof, may be incorporated in the processor 112 in some embodiments. Further, in some embodiments, one or more of the illustrative components may be omitted from the network switch 108.

The processor 112 may be embodied as any type of processor capable of performing the functions described herein. For example, the processor 112 may be embodied as one or more single core processors, on or more multi-core processors, a digital signal processor, a microcontroller, or other processor or processing/controlling circuit. Similarly, the memory 116 may be embodied as any type of volatile or non-volatile memory or data storage capable of performing the functions described herein. In operation, the memory 116 may store various data and software used during operation of the network switch 108, such as operating systems, applications, programs, libraries, and drivers.

The memory 116 is communicatively coupled to the processor 112 via the I/O subsystem 114, which may be embodied as circuitry and/or components to facilitate input/output operations with the processor 112, the memory 116, and other components of the network switch 108. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 112, the memory 116, and other components of the network switch 108, on a single integrated circuit chip.

The data storage device 118 may be embodied as any type of device or devices configured for short-term or long-term storage of data such as, for example, memory devices and circuits, memory cards, hard disk drives, solid-state drives, or other data storage devices. It should be appreciated that the data storage device 118 and/or the memory 116 (e.g., the computer-readable storage media) may store various data as described herein, including operating systems, applications, programs, libraries, drivers, instructions, etc., capable of being executed by a processor (e.g., the processor 112) of the network switch 108.

The communication circuitry 120 may be embodied as any communication circuit, device, or collection thereof, capable of enabling communications between the network switch 108 and other computing devices, such as the network nodes 110, as well as a remote network computing device (e.g., a network controller, a load balancing network switch/router, an aggregated network switch, another network switch 108, etc.) over a network (e.g., the network 104). The communication circuitry 120 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

The illustrative communication circuitry 120 includes multiple switch ports 122 and a pipeline logic unit 124. The multiple switch ports 122 (i.e., input/output ports) may be embodied as any type of network port for transmitting and receiving data to/from the network switch 108. Accordingly, in some embodiments, the network switch 108 may be configured to create a separate collision domain for each of the switch ports 122. As such, depending on the network design of the network switch 108 and the operation mode (e.g., half-duplex, full-duplex, etc.), it should be appreciated that each of the network nodes 110 connected to one of the switch ports 122 of the network switch 108 may be configured to transfer data to any of the other network nodes 110 at any given time, and the transmissions should not interfere, or collide.

The pipeline logic unit 124 may be embodied as any specialized device, circuitry, hardware, or combination thereof to perform pipeline logic (e.g., hardware algorithms) for performing the functions described herein. In some embodiments, the pipeline logic unit 124 may be embodied as a system-on-a-chip (SoC) or otherwise form a portion of a SoC of the network switch 108 (e.g., incorporated, along with the processor 112, the memory 116, the communication circuitry 120, and/or other components of the network switch 108, on a single integrated circuit chip). Alternatively, in some embodiments, the pipeline logic unit 124 may be embodied as one or more discrete processing units of the network switch 108, each of which may be capable of performing one or more of the functions described herein. For example, the pipeline logic unit 124 may be configured to process network packets (e.g., parse received network packets, determine destination computing devices for each received network packets, forward the network packets to a particular buffer queue of a respective buffer of the network switch 108, etc.), perform computational functions, etc.

Each of the network nodes 110 may be embodied as any type of compute and/or storage device capable of performing the functions described herein. For example, each of the network nodes 110 may be embodied as, without limitation, one or more server computing devices, computer mainboards, daughtercards, expansion cards, system-on-a-chips, computer processors, consumer electronic devices, smart appliances, storage disks, and/or any other compute and/or storage device or collection of compute and/or storage devices capable of processing network communications. Accordingly, it should be appreciated that the various network nodes 110 may additionally include components similar to the illustrative network switch 108 as described above, such as, a processor, an I/O subsystem, memory, data storage, and/or communication circuitry. As such, to preserve clarity of the description, descriptions of such like and/or similar components are not described herein. Of course, it should be appreciated that one or more of the network nodes 110 may include additional and/or alternative components, such as those commonly found in a computing device (e.g., various input/output devices), in other embodiments. Additionally, in some embodiments, one or more of the illustrative components may be incorporated in, or otherwise from a portion of, another component.

Figure 2:
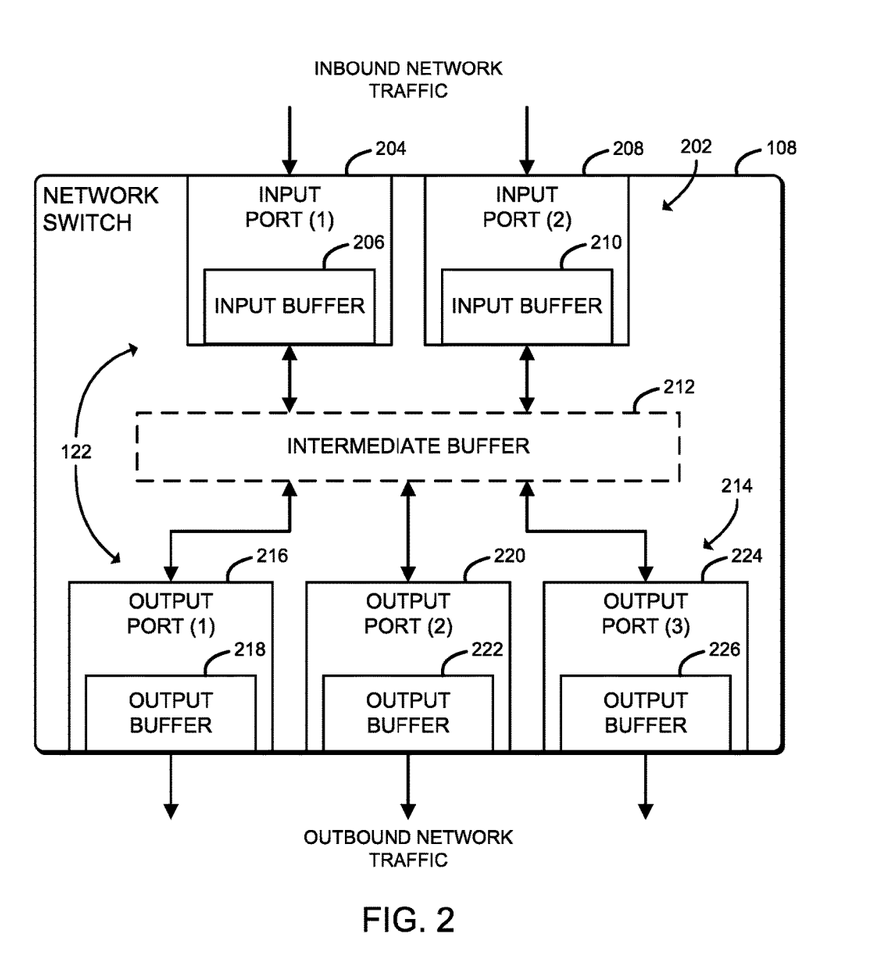
FIG. 2 is a simplified block diagram of at least one embodiment of network traffic flow through the network switch of the system of FIG. 1.

Referring now to FIG. 2, in an illustrative embodiment, the network switch 108 includes multiple input ports 202 communicatively coupled to multiple output ports 214 to facilitate the flow of network traffic through the network switch 108. Each of the input ports 202 is configured to receive inbound network traffic (e.g., network packets, messages, etc.) and transmit the received network traffic to a corresponding one of the output ports 214. The network traffic received by the input ports 202 is forwarded to the appropriate output ports 202 based on a routing decision (e.g., the adaptive routing technologies described herein), which may be made by a logical component (not shown) of the network switch 108, such as a network scheduler, or packet scheduler, and/or a queue manager. The illustrative input ports 202 (i.e., a first input port designated as input port (1) 204 and a second input port designated as input port (2) 208) each include an input buffer (i.e., input buffer 206 of input port (1) 204 and input buffer 210 of input port (2) 208) to store the received network packets (e.g., in input buffer queues of the input buffers 206, 210) before transmission to an appropriate one of the output ports 214.

In some embodiments, one or more intermediate buffers 212 (e.g., in intermediate buffer queues of the one or more intermediate buffers 212) may be used to buffer network traffic from the input ports 202 and utilize the adaptive routing technologies described herein to determine the appropriate one of the output ports 214 to transmit each received network packet. Each of the illustrative output ports 214 (i.e., a first output port designated as output port (1) 216, a second output port designated as output port (2) 220, and a third output port designated as output port (3) 224) similarly include an output buffer (i.e., output buffer 218 of output port (1) 204, output buffer 222 of output port (2) 220, and output buffer 226 of output port (3) 224) for queueing received network packets from the input ports 202 or the intermediate buffer 212, depending on the embodiment.

The output ports 214 are configured to forward outbound network traffic (i.e., from the applicable output buffer queues) to a target computing device (e.g., a corresponding one of the network nodes 110, another network switch 108, etc.) to which the network packet is to be forwarded. It should be appreciated that each output buffer of the output ports 214 can include more than one output buffer queue (see, e.g., the output buffer queues 500 of FIGS. 5 and 6) and each of the output buffer queues can be assigned to a different input row (e.g., in a tile-based architecture) or to one or more virtual channels, depending on the embodiment. It should be appreciated that each of the output buffer queues logically belongs to a respective one of the output ports 214, but may physically be present in another location (e.g., another component) within the switch 108. For example, in some embodiments, there may be a per-output-port queue in the intermediate buffer 212 or one of the input buffers 206 that is logically mapped to a respective one of the output ports 214.

Figure 3:
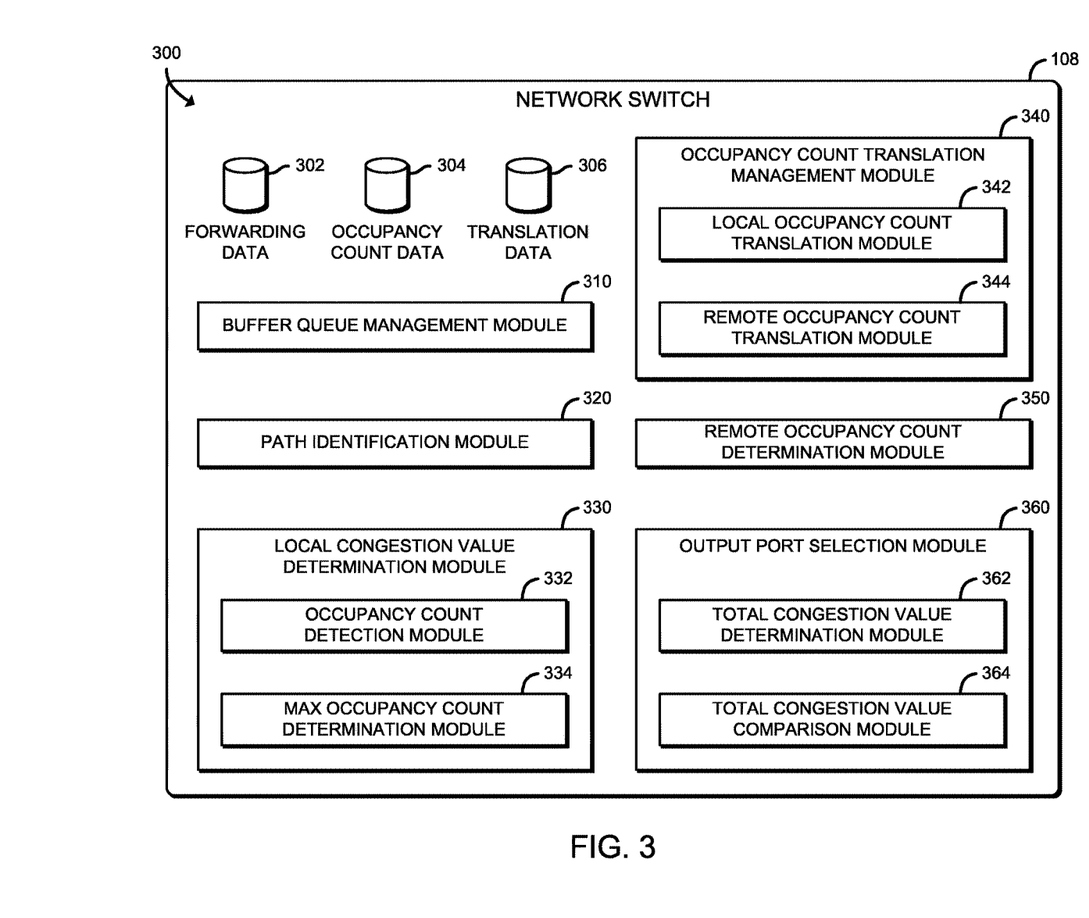
FIG. 3 is a simplified block diagram of at least one embodiment of an environment that may be established by the network switch of the system of FIG. 1.

Referring now to FIG. 3, in an illustrative embodiment, the network switch 108 establishes an environment 300 during operation. The illustrative environment 300 includes a buffer queue management module 310, a path identification module 320, a local congestion value determination module 330, an occupancy count translation management module 340, a remote occupancy count determination module 350, and an output port selection module 360. The various modules of the environment 300 may be embodied as hardware, firmware, software, or a combination thereof. As such, in some embodiments, one or more of the modules of the environment 300 may be embodied as circuitry or collection of electrical devices (e.g., a buffer queue management circuit 310, a path identification circuit 320, a local congestion value determination circuit 330, an occupancy count translation management circuit 340, a remote occupancy count determination circuit 350, an output port selection circuit 360, etc.).

It should be appreciated that, in such embodiments, one or more of the buffer queue management circuit 310, the path identification circuit 320, the local congestion value determination circuit 330, the occupancy count translation management circuit 340, the remote occupancy count determination circuit 350, and/or the output port selection circuit 360 may form a portion of the one or more of the processor(s) 112, the I/O subsystem 114, the communication circuitry 120, the pipeline logic unit 124, and/or other components of the network switch 108. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the one or more processors and/or other components of the network switch 108. It should be further appreciated that, in some embodiments, one or more of the buffer queue management circuit 310, the path identification circuit 320, the local congestion value determination circuit 330, the occupancy count translation management circuit 340, the remote occupancy count determination circuit 350, and/or the output port selection circuit 360 may be implemented as special purpose hardware components, such as those circuits that may be on a critical path.

In the illustrative environment 300, the network switch 108 further includes forwarding data 302, occupancy count data 304, and translation data 306, each of which may be stored in a memory and/or data storage device of the network switch 108. Further, each of the forwarding data 302, the occupancy count data 304, and the translation data 306 may be accessed by the various modules and/or sub-modules of the network switch 108. Additionally, it should be appreciated that in some embodiments the data stored in, or otherwise represented by, each of the forwarding data 302, the occupancy count data 304, and the translation data 306 may not be mutually exclusive relative to each other.

For example, in some implementations, data stored in the forwarding data 302 may also be stored as a portion of the occupancy count data 304 and/or the translation data 306, and/or vice versa. As such, although the various data utilized by the network switch 108 is described herein as particular discrete data, such data may be combined, aggregated, and/or otherwise form portions of a single or multiple data sets, including duplicative copies, in other embodiments. It should be further appreciated that the network switch 108 may include additional and/or alternative components, sub-components, modules, sub-modules, and/or devices commonly found in a network computing device, which are not illustrated in FIG. 3 for clarity of the description.

The buffer queue management module 310, which may be embodied as hardware, firmware, software, virtualized hardware, emulated architecture, and/or a combination thereof as discussed above, is configured to manage the buffers (e.g., each buffer including a number of buffer queues) of the network switch 108. For example, the buffer queue management module 310 may be configured to manage the input buffer (e.g., of the input buffers 206, 210), the intermediate buffers (e.g., the intermediate buffers 212 of FIG. 2), and output buffer (e.g., of the output ports 214) of the network switch 108. To do so, the buffer queue management module 310 is configured to enqueue and dequeue network traffic received by the network switch 108 into and out of the respective buffers (i.e., the respective buffer queues).

The path identification module 320, which may be embodied as hardware, firmware, software, virtualized hardware, emulated architecture, and/or a combination thereof as discussed above, is configured to identify applicable paths (e.g., minimal paths and non-minimal paths) for each received network packet. To do so, the path identification module 320 may identify a characteristic of the network packet to determine a destination computing device. The characteristic may include any data usable to identify the corresponding destination computing device, such as a workload type, a destination address (e.g., an IP address, a destination MAC address, etc.), 5-tuple flow identification, etc. Accordingly, in some embodiments, the characteristic may be used to perform a lookup (e.g., in a flow lookup table, a routing table, etc.) to determine the destination computing device. In some embodiments, the lookup data may be stored in the forwarding data 302.

The path identification module 320 is further configured to identify one or more minimal paths and one or more non-minimal paths based on the determined destination computing device. It should be appreciated that, in adaptive routing, the network switch 108 can route a network packet either through a minimal path or a non-minimal path. It should be further appreciated that a minimal path is the path to the determined destination computing device that takes the least amount of hops, while a non-minimal path is any path to the determined destination computing device that takes more hops (e.g., twice as many hops) as the minimal path. Accordingly, it should be appreciated that the computing device to which the network packet is forwarded from the network switch 108 may not be to the determined destination computing device, but rather to a target computing device in the path between the network switch 108 and the determined destination computing device. In some embodiments, path data (e.g., hop data, in-path computing device information, etc.) may be stored in the forwarding data 302.

Figure 6:
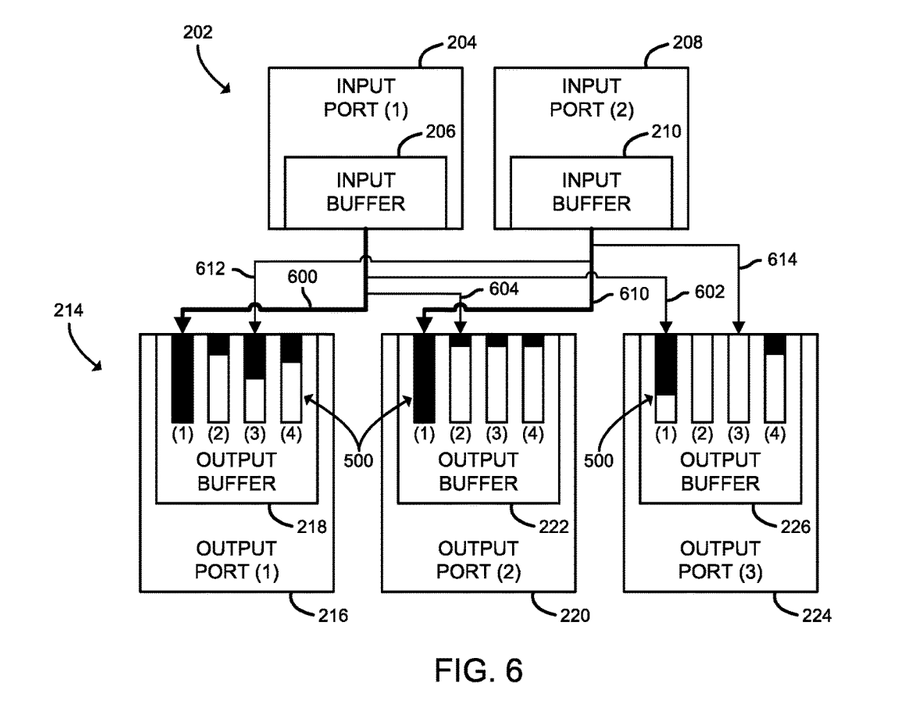
FIG. 6 is a simplified illustration of at least one embodiment for visualizing output buffer queue saturation resulting from non-minimal path competition between input and output ports of the network switch of FIG. 3.

Referring to FIG. 6, an illustrative embodiment for visualizing output buffer queue saturation resulting from non-minimal path competition is shown. For example, two competing network packet flows arriving on respective input ports 202 may be competing for non-minimal path resources. The network packet flow arriving at input port (1) 204 has a minimal path 600 and non-minimal paths 602, 604 on output port (1) 216, while the network packet flow arriving at input port (2) 208 has minimal path 610 and non-minimal paths 612, 614 on output port (2) 220. It should be appreciated that, in adaptive routing, non-minimal paths consume more overall network resources, as they include more hops than minimal paths. As such, the requirement to use a non-minimal path may be based on whether the congestion on a non-minimal port is less than half of the congestion on the minimal port.

Figure 5:
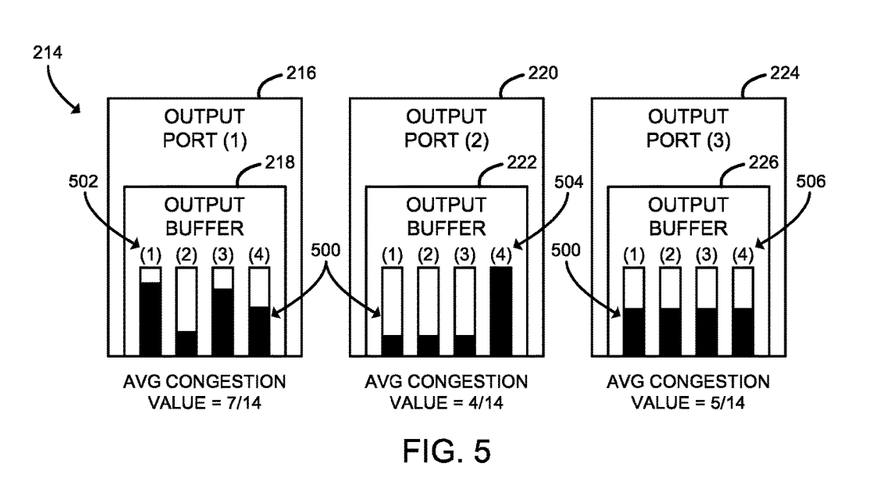
FIG. 5 is a simplified illustration of at least one embodiment of congestion values associated with output buffer queues of the network switch of FIG. 3.

Referring again to FIG. 3, the local congestion value determination module 330, which may be embodied as hardware, firmware, software, virtualized hardware, emulated architecture, and/or a combination thereof as discussed above, is configured to determine a local congestion value for each output buffer based on the occupancy count of each of the output buffer queues (see, e.g., the output buffer queues 500 of FIGS. 5 and 6). To do so, the illustrative local congestion value determination module 330 includes an occupancy count detection module 332 and a maximum occupancy count determination module 334. It should be appreciated that each of the occupancy count detection module 332 and the maximum occupancy count determination module 334 of the local congestion value determination module 330 may be separately embodied as hardware, firmware, software, virtualized hardware, emulated architecture, and/or a combination thereof. For example, the occupancy count detection module 332 may be embodied as a hardware component, while the maximum occupancy count determination module 334 may be embodied as a virtualized hardware component or as some other combination of hardware, firmware, software, virtualized hardware, emulated architecture, and/or a combination thereof.

The occupancy count detection module 332 is configured to detect an occupancy count for each output buffer queue of each output buffer for each output port 214 in each path (e.g., the minimal path, each of the non-minimal paths, etc.) of the network packet to be transmitted, such as may be determined by the path identification module 320. To do so, the occupancy count detection module 332 is configured to detect a number of elements presently queued in each output buffer queue of an output buffer. The maximum occupancy count determination module 334 is configured to determine a maximum occupancy count of each output buffer for each output port 214 in the respective path based on the detected number of elements presently queued in each output buffer queue of each output buffer. In other words, for each output port 214, or corresponding output buffer, the maximum occupancy count determination module 334 is configured to determine which output buffer queue has the most elements presently queued in the output buffer queues. In some embodiments, the occupancy counts may be stored in the occupancy count data 304. It should be appreciated that, in some embodiments, the maximum occupancy count determination module 334 may be additionally or alternatively configured to determine the maximum occupancy count of each output buffer for each output port 214 in the respective path based on another mathematical operation, such as a root mean square (RMS).

The occupancy count translation management module 340, which may be embodied as hardware, firmware, software, virtualized hardware, emulated architecture, and/or a combination thereof as discussed above, is configured to translate the occupancy count values into a corresponding congestion value. To do so, the occupancy count translation management module 340 is configured to compare an occupancy count (e.g., the maximum occupancy count) against a translation table. In other words, the occupancy count translation management module 340 is configured to perform a lookup on the translation table to retrieve a congestion value that corresponds to the occupancy count used to perform the lookup. In some embodiments, the occupancy count translation information (e.g., the translation table data) may be stored in the translation data 306.

The illustrative occupancy count translation management module 340 includes a local occupancy count translation module 342 to translate a local occupancy count (i.e., local to the network switch 108) into a local congestion value and a remote occupancy count translation module 344 to translate a remote occupancy count (e.g., from a remote input buffer coupled to a corresponding output port of the network switch 108) into a remote congestion value. It should be appreciated that each of the local occupancy count translation module 342 and the remote occupancy count translation module 344 of the occupancy count translation management module 340 may be separately embodied as hardware, firmware, software, virtualized hardware, emulated architecture, and/or a combination thereof. For example, the local occupancy count translation module 342 may be embodied as a hardware component, while the remote occupancy count translation module 344 may be embodied as a virtualized hardware component or as some other combination of hardware, firmware, software, virtualized hardware, emulated architecture, and/or a combination thereof.

The remote occupancy count determination module 350, which may be embodied as hardware, firmware, software, virtualized hardware, emulated architecture, and/or a combination thereof as discussed above, is configured to determine a remote occupancy count of a remote input buffer (i.e., a dedicated input buffer only fed by the respective output port 214 of the network switch 108) of a remote computing device (e.g., another network switch 108, one of the network nodes 110, etc.). To do so, the remote occupancy count determination module 350 is configured to track a number of elements presently in the remote input buffer, such as may be tracked using a credit-based system. For example, the remote occupancy count determination module 350 may be configured to increment a remote element count with each network packet forwarded to the remote input buffer and decrement the remote element count upon receipt of an acknowledgment from the remote computing device that indicates an element was dequeued from the remote input buffer.

The output port selection module 360, which may be embodied as hardware, firmware, software, virtualized hardware, emulated architecture, and/or a combination thereof as discussed above, is configured to select which output port to transfer the network packet to. In other words, the output port selection module 360 is configured to select which output port is to forward the network packet. To do so, the illustrative output port selection module 360 includes a total congestion value determination module 362 and a total congestion value comparison module 364. It should be appreciated that each of the total congestion value determination module 362 and the total congestion value comparison module 364 of the output port selection module 360 may be separately embodied as hardware, firmware, software, virtualized hardware, emulated architecture, and/or a combination thereof. For example, the total congestion value determination module 362 may be embodied as a hardware component, while the total congestion value comparison module 364 may be embodied as a virtualized hardware component or as some other combination of hardware, firmware, software, virtualized hardware, emulated architecture, and/or a combination thereof.

The total congestion value determination module 362 is configured to determine a total congestion value for each output buffer. To do so, the total congestion value determination module 362 is configured to compare a local congestion value, such as may be determined by the local congestion value determination module 330, and a remote congestion value, such as may be determined based on a translation (e.g., as may be translated by the remote occupancy count translation module 344) of a remote occupancy count (e.g., as may be determined by the remote occupancy count determination module 350), to determine a total congestion value for each output buffer.

For example, the total congestion value determination module 362 may be configured to determine the total congestion value based on a maximum value between the local and remote congestion values, a root mean square of the local and remote congestion values, or by some other determining calculation other than the average of the local and remote congestion values. It should be appreciated that in such embodiments in which the remote mean square of the local and remote congestion values is used to determine the total congestion value, the total congestion value determination module 362 may be configured to make an exception for the case in which any of the output buffer queues are completely full by saturating the local congestion value.

The total congestion value comparison module 364 is configured to compare the total congestion values (e.g., as may be determined by the total congestion value determination module 362) to determine which output port has the lowest total congestion value. In other words, the total congestion value comparison module 364 is configured to determine which output port to queue the network packet in to be forwarded to a target computing device based on which output buffer has the lowest total congestion value. Accordingly, congestion artifacts resulting from remote buffer ambiguity (e.g., in an embodiment wherein the output port is congested and the input buffer is empty, has some elements, or is completely full based on downstream congestion) may be substantially removed. Additionally, referring again to the illustrative embodiment of FIG. 6, both flows into the input ports 202 completely fill (i.e., saturate) their respective minimal path output buffer queues. In such embodiments, using the lowest total congestion value as determined by the total congestion value comparison module 364 would result in selection of the output port (3) 224 (i.e., due to the saturated output buffer queues resulting in maximum congestion values), despite output port (3) 224 being a non-minimal path for both flows, thereby promoting fairness in selection across the output ports 214.

Figure 4:
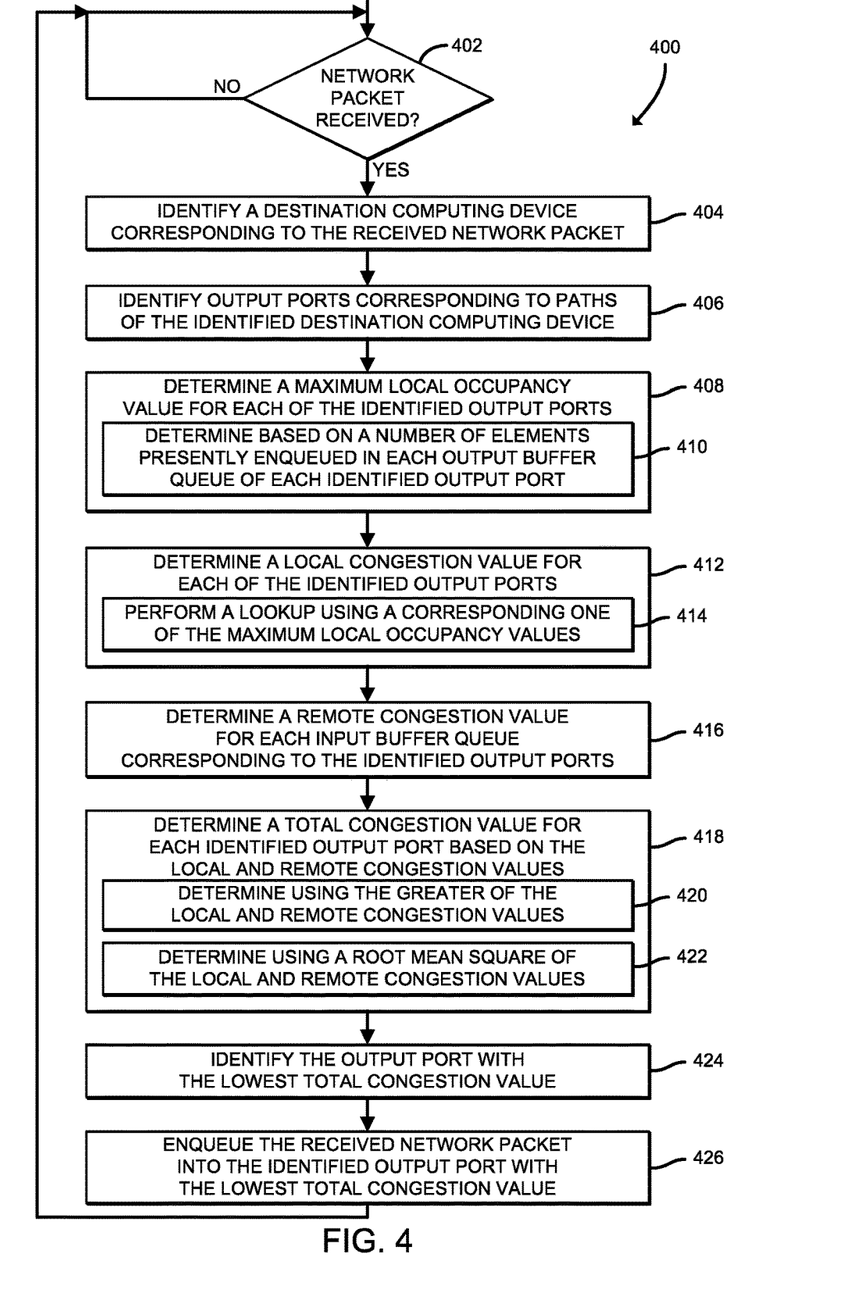
FIG. 4 is a simplified flow diagram of at least one embodiment of a method for adaptive routing based on aggregated congestion information that may be executed by the network switch of FIG. 3.

Referring now to FIG. 4, in use, the network switch 108 (e.g., the pipeline logic unit 124) may execute a method 400 for adaptive routing based on aggregated congestion information. It should be appreciated that, in some embodiments, the method 400 may be embodied as various instructions stored on a computer-readable media, which may be executed by a processor (e.g., the processor 112), the communication circuitry 120, and/or other components of the network switch 108 to cause the network switch 108 to perform at least a portion of the method 400. The computer-readable media may be embodied as any type of media capable of being read by the network switch 108 including, but not limited to, the memory 116, the data storage device 118, other memory or data storage devices of the network switch 108, portable media readable by a peripheral device of the network switch 108, and/or other media. Additionally or alternatively, in some embodiments, the pipeline logic unit 124 may be configured to perform at least a portion of the method 400 or otherwise cause the network switch 108 to perform at least a portion of the method 400.

The method 400 begins in block 402, in which the network switch 108 determines whether a network packet has been received. If so, the method 400 advances to block 404, in which the network switch 108 identifies a destination computing device (e.g., a network node local to or remote of the network switch 108) corresponding to the received network packet. In block 406, the network switch 108 identifies multiple output ports to forward the received network packet to, each of which are identified based on which of the output ports correspond to paths (e.g., minimal or non-minimal paths) to the destination computing device. As described previously, it should be appreciated that the identified output ports may output the network packet to a target computing device (e.g., another network switch 108, a network node local to or remote of the network switch 108, etc.) different from the destination computing device that is in an identified path to the destination computing device.

In block 408, the network switch 108 determines a maximum occupancy count for each of the identified output ports. In block 410, the network switch 108 determines the maximum occupancy count for each of the identified output ports based on a maximum number of elements presently queued in the corresponding output buffer queues (i.e., a present occupancy count) for each identified output port. In other words, the network switch 108 determines the present occupancy count (i.e., a number of elements presently queued) for each of the output buffer queues for a particular one of the identified output ports, identifies which of the output buffer queues has the greatest number of elements, and sets the maximum local occupancy count associated with that identified output port equal to the number of elements of the output buffer queue identified as having the greatest number of elements. For example, in an embodiment with an output buffer of an output port having three output buffer queues, the first output buffer queue having a 150 elements presently queued, the second output buffer queue having 30 elements presently queued, and the third output buffer queue having 120 elements presently queued, the maximum local occupancy for the output buffer is equal to 150 elements.

In block 412, the network switch 108 retrieves or otherwise determines a local congestion value for each of the identified output ports. To do so, in block 414, the network switch 108 performs a lookup using the maximum local occupancy on a translation table. In block 416, the network switch 108 determines a remote congestion value for each corresponding input buffer corresponding to the output ports identified in block 406. To do so, as described previously, the network switch 108 may be configured to track a number of elements presently in the remote input buffer (i.e., a remote occupancy count), such as may be tracked using a credit-based system. Further, the network switch 108 may be configured to, similar to retrieving the local congestion value, perform a lookup on a translation table using the remote occupancy count to determine the remote congestion value (i.e., the output of the lookup).

In block 418, the network switch 108 determines a total congestion value for each identified output port based on the local congestion value retrieved in block 412 and the remote congestion value determined in block 416. For example, in block 420, the network switch 108 may determine the total congestion value based on the maximum value between the local and remote congestion values. Alternatively, in another example, in block 422, the network switch 108 may determine the total congestion value using a result of a root mean square of the local and remote congestion values. It should be appreciated that, in other embodiments, other algorithms or methodologies may be used to determine the total congestion value based on the local and remote congestion values. In block 424, the network switch 108 identifies the output port with the lowest total congestion value. In block 426, the network switch 108 enqueues the network packet received in block 402 into the output port identified in block 424 as having the lowest total congestion value.

It should be appreciated that, in some embodiments, certain operations described in the method 400 may be performed in parallel and/or out of the critical path. In an illustrative embodiment of one such optimization of the method 400, blocks 408, 412, 416, and 418 may be computed out of the critical path, In such embodiments, the results of the computation may be stored in cache and subsequently looked up for an identified output port.

In use, as described previously, elements from the input ports 202 or the intermediate buffer 212, depending on the embodiment, are transmitted to an output buffer queue of an output buffer of a corresponding output port 214. It should be appreciated that the output buffer queue within the output port is statically determined based on the input port, or the intermediate buffer 212, depending on the embodiment. Referring now to FIG. 5, an illustrative embodiment for combining multiple output queues into a single congestion value (i.e., an average congestion value) includes a visual representation of elements presently in output buffer queues 500 with corresponding average congestion values.

In the illustrative embodiments, the statically determined output buffer queues 500 correspond to output buffer queue (1) 502 (i.e., the first output buffer queue) of output port (1) 216, output buffer queue (4) 504 (i.e., the fourth output buffer queue) of output port (2) 220, and output buffer queue (4) 506 (i.e., the fourth output buffer queue) of output port (3) 224. Of the three possible output ports 214, the output buffer queue (4) 504 (i.e., the fourth output buffer queue) of output port (2) 220 has the lowest corresponding average congestion value but is completely full, while the output buffer queue (1) 500 of output port (1) 216 and the output buffer queue (4) 506 of output port (3) 224 are not.

As described previously, present congestion-based adaptive routing based technologies that combine each of the output buffer queues into a single congestion value for each output port (i.e., treat multiple output buffer queues as a single buffer queue using an average congestion value), the network switch 108 is configured to determine the applicable output port for a received network packet based on a congestion value determined from a maximum number of elements in each output buffer queue of a corresponding output port. Accordingly, relying on adaptive routing based on aggregated congestion information as described herein, the network switch 108 could avoid selecting the output port 214 with the saturated output buffer queue, since the saturated output buffer queue element count would result in a saturated total congestion value for that output port 214.

EXAMPLES

Illustrative examples of the technologies disclosed herein are provided below. An embodiment of the technologies may include any one or more, and any combination of, the examples described below.

Example 1 includes a network switch for adaptive routing based on aggregated congestion information, the network switch comprising a plurality of output ports; and a pipeline logic unit to determine, for each output port, an occupancy count for each of a plurality of output buffer queues of a corresponding output port, wherein each occupancy count defines a present number of elements in the corresponding output buffer queue; determine, for each output port, a maximum local occupancy count based on the determined occupancy counts of the output buffer queues of the corresponding output port; determine, for each output port, a local congestion value based on the maximum local occupancy count of the corresponding output port; determine, for each output port, a remote congestion value for a corresponding remote input buffer queue of a remote input port of a remote computing device communicatively coupled to the corresponding output port; determine, for each output port, a total congestion value as a function of the local congestion value and the remote congestion value; and enqueue the network packet into one of the plurality of output buffer queues of one of the plurality of output ports based on the total congestion values of the plurality of output ports.

Example 2 includes the subject matter of Example 1, and wherein to determine the local congestion value comprises to perform a lookup on a translation table, wherein the translation table maps maximum local occupancy counts to corresponding local congestion values.

Example 3 includes the subject matter of any of Examples 1 and 2, and wherein to determine the remote congestion value comprises to perform a lookup on a translation table based on a number of queued elements presently queued in the corresponding remote input buffer queue of the remote input port, wherein the translation table maps remote congestion values to values of the number of queued elements to corresponding remote congestion values.

Example 4 includes the subject matter of any of Examples 1-3, and wherein the pipeline logic unit is further to track the number of queued elements presently in each of the remote input buffer queues, wherein to track the number of queued elements presently in each of the remote input buffer queues comprises to (i) increment, for each input buffer queue of each input port, a corresponding queued element counter associated with a corresponding input buffer queue in response to having transmitted of an element from a corresponding output buffer queue communicatively coupled to the corresponding input buffer queue and (ii) decrement, for each input buffer queue of each input port, the corresponding queued element counter upon in response to having received an acknowledgement from the corresponding input buffer queue that a previously queued element in the corresponding input buffer queue has been dequeued.

Example 5 includes the subject matter of any of Examples 1-4, and wherein to enqueue the network packet into the one of the plurality of output buffer queues of the one of the plurality of output ports comprises to enqueue the network packet based on which of the plurality of output ports has a lowest total congestion value.

Example 6 includes the subject matter of any of Examples 1-5, and wherein to determine the total congestion value for each output port comprises to determine the total congestion value as a function of the greater of the local congestion value and the remote congestion value.

Example 7 includes the subject matter of any of Examples 1-6, and wherein to determine the total congestion value for each output port comprises to determine the total congestion value as a function of a root mean square of the local congestion value and the remote congestion value.

Example 8 includes a network switch for adaptive routing based on aggregated congestion information, the network switch comprising one or more processors; a plurality of output ports; a local congestion value determination circuit to detect, for each output port, an occupancy count for each of a plurality of output buffer queues of a corresponding output port, wherein each occupancy count defines a present number of elements in the corresponding output buffer queue, determine, for each output port, a maximum local occupancy count based on the determined occupancy counts of the output buffer queues of the corresponding output port, and determine, for each output port, a local congestion value based on the maximum local occupancy count of the corresponding output port; a remote occupancy count determination circuit to determine, for each output port, a remote congestion value for a corresponding remote input buffer queue of a remote input port of a remote computing device communicatively coupled to the corresponding output port; an output port selection circuit to determine, for each output port, a total congestion value as a function of the local congestion value and the remote congestion value; and a buffer queue management circuit to enqueue the network packet into one of the plurality of output buffer queues of one of the plurality of output ports based on the total congestion values of the plurality of output ports.

Example 9 includes the subject matter of Example 8, and wherein to determine the local congestion value comprises to perform a lookup on a translation table, wherein the translation table maps maximum local occupancy counts to corresponding local congestion values.

Example 10 includes the subject matter of any of Examples 8 and 9, and wherein to determine the remote congestion value comprises to perform a lookup on a translation table based on a number of queued elements presently queued in the corresponding remote input buffer queue of the remote input port, wherein the translation table maps remote congestion values to values of the number of queued elements to corresponding remote congestion values.

Example 11 includes the subject matter of any of Examples 8-10, and wherein the remote occupancy count determination circuit is further to track the number of queued elements presently in each of the remote input buffer queues, and wherein to track the number of queued elements presently in each of the remote input buffer queues comprises to (i) increment, for each input buffer queue of each input port, a corresponding queued element counter associated with a corresponding input buffer queue in response to having transmitted of an element from a corresponding output buffer queue communicatively coupled to the corresponding input buffer queue and (ii) decrement, for each input buffer queue of each input port, the corresponding queued element counter upon in response to having received an acknowledgement from the corresponding input buffer queue that a previously queued element in the corresponding input buffer queue has been dequeued.

Example 12 includes the subject matter of any of Examples 8-11, and wherein to enqueue the network packet into the one of the plurality of output buffer queues of the one of the plurality of output ports comprises to enqueue the network packet based on which of the plurality of output ports has a lowest total congestion value.

Example 13 includes the subject matter of any of Examples 8-12, and wherein to determine the total congestion value for each output port comprises to determine the total congestion value as a function of the greater of the local congestion value and the remote congestion value.

Example 14 includes the subject matter of any of Examples 8-13, and wherein to determine the total congestion value for each output port comprises to determine the total congestion value as a function of a root mean square of the local congestion value and the remote congestion value.

Example 15 includes a method for adaptive routing based on aggregated congestion information, the method comprising determining, by a network switch for each output port of a plurality of output ports of the network switch, an occupancy count for each of a plurality of output buffer queues of a corresponding output port, wherein each occupancy count defines a present number of elements in the corresponding output buffer queue; determining, by the network switch for each output port, a maximum local occupancy count based on the determined occupancy counts of the output buffer queues of the corresponding output port; determining, by the network switch for each output port, a local congestion value based on the maximum local occupancy count of the corresponding output port; determining, by the network switch for each output port, a remote congestion value for a corresponding remote input buffer queue of a remote input port of a remote computing device communicatively coupled to the corresponding output port; determining, by the network switch for each output port, a total congestion value as a function of the local congestion value and the remote congestion value; and enqueuing the network packet into one of the plurality of output buffer queues of one of the plurality of output ports based on the total congestion values of the plurality of output ports.

Example 16 includes the subject matter of Example 15, and wherein determining the local congestion value comprises performing a lookup on a translation table, wherein the translation table maps maximum local occupancy counts to corresponding local congestion values.

Example 17 includes the subject matter of any of Examples 15 and 16, and wherein determining the remote congestion value comprises performing a lookup on a translation table based on a number of queued elements presently queued in the corresponding remote input buffer queue of the remote input port, wherein the translation table maps remote congestion values to values of the number of queued elements to corresponding remote congestion values.

Example 18 includes the subject matter of any of Examples 15-17, and further including tracking the number of queued elements presently in each of the remote input buffer queues, wherein tracking the number of queued elements presently in each of the remote input buffer queues comprises (i) incrementing, for each input buffer queue of each input port, a corresponding queued element counter associated with a corresponding input buffer queue in response to having transmitted of an element from a corresponding output buffer queue communicatively coupled to the corresponding input buffer queue and (ii) decrementing, for each input buffer queue of each input port, the corresponding queued element counter upon in response to having received an acknowledgement from the corresponding input buffer queue that a previously queued element in the corresponding input buffer queue has been dequeued.

Example 19 includes the subject matter of any of Examples 15-18, and wherein enqueuing the network packet into the one of the plurality of output buffer queues of the one of the plurality of output ports comprises enqueuing the network packet based on which of the plurality of output ports has a lowest total congestion value.

Example 20 includes the subject matter of any of Examples 15-19, and wherein determining the total congestion value for each output port comprises determining the total congestion value as a function of the greater of the local congestion value and the remote congestion value.

Example 21 includes the subject matter of any of Examples 15-20, and wherein determining the total congestion value for each output port comprises determining the total congestion value as a function of a root mean square of the local congestion value and the remote congestion value.

Example 22 includes a network switch comprising a processor; and a memory having stored therein a plurality of instructions that when executed by the processor cause the network switch to perform the method of any of Examples 15-21.

Example 23 includes one or more machine readable storage media comprising a plurality of instructions stored thereon that in response to being executed result in a network switch performing the method of any of Examples 15-21.

Example 24 includes a network switch for adaptive routing based on aggregated congestion information, the network switch comprising a local congestion value determination circuit to detect, for each of a plurality of output ports of the network switch, an occupancy count for each of a plurality of output buffer queues of a corresponding output port, wherein each occupancy count defines a present number of elements in the corresponding output buffer queue, determine, for each output port, a maximum local occupancy count based on the determined occupancy counts of the output buffer queues of the corresponding output port, and determine, for each output port, a local congestion value based on the maximum local occupancy count of the corresponding output port; a remote occupancy count determination circuit to determine, for each output port, a remote congestion value for a corresponding remote input buffer queue of a remote input port of a remote computing device communicatively coupled to the corresponding output port; means for determining, for each output port, a total congestion value as a function of the local congestion value and the remote congestion value; and a buffer queue management circuit to enqueue the network packet into one of the plurality of output buffer queues of one of the plurality of output ports based on the total congestion values of the plurality of output ports.

Example 25 includes the subject matter of Example 24, and wherein to determine the local congestion value comprises to perform a lookup on a translation table, wherein the translation table maps maximum local occupancy counts to corresponding local congestion values.

Example 26 includes the subject matter of any of Examples 24 and 25, and wherein to determine the remote congestion value comprises to perform a lookup on a translation table based on a number of queued elements presently queued in the corresponding remote input buffer queue of the remote input port, wherein the translation table maps remote congestion values to values of the number of queued elements to corresponding remote congestion values.

Example 27 includes the subject matter of any of Examples 24-26, and wherein the remote occupancy count determination circuit is further to track the number of queued elements presently in each of the remote input buffer queues, and wherein to track the number of queued elements presently in each of the remote input buffer queues comprises to (i) increment, for each input buffer queue of each input port, a corresponding queued element counter associated with a corresponding input buffer queue in response to having transmitted of an element from a corresponding output buffer queue communicatively coupled to the corresponding input buffer queue and (ii) decrement, for each input buffer queue of each input port, the corresponding queued element counter upon in response to having received an acknowledgement from the corresponding input buffer queue that a previously queued element in the corresponding input buffer queue has been dequeued.

Example 28 includes the subject matter of any of Examples 24-27, and wherein to enqueue the network packet into the one of the plurality of output buffer queues of the one of the plurality of output ports comprises to enqueue the network packet based on which of the plurality of output ports has a lowest total congestion value.

Example 29 includes the subject matter of any of Examples 24-28, and wherein the means for determining the total congestion value for each output port comprises means for determining the total congestion value as a function of the greater of the local congestion value and the remote congestion value.

Example 30 includes the subject matter of any of Examples 24-29, and wherein the means for determining the total congestion value for each output port comprises means for determining the total congestion value as a function of a root mean square of the local congestion value and the remote congestion value.

The invention claimed is:

1. A network switch for adaptive routing based on aggregated congestion information, the network switch comprising:
   a plurality of output ports; and
   a pipeline logic unit to:
   determine, for each output port, an occupancy count for each of a plurality of output buffer queues of a corresponding output port, wherein each occupancy count defines a present number of elements in the corresponding output buffer queue;
   determine, for each output port, a maximum local occupancy count based on the determined occupancy counts of the output buffer queues of the corresponding output port;
   determine, for each output port, a local congestion value based on the maximum local occupancy count of the corresponding output port;
   determine, for each output port, a remote congestion value for a corresponding remote input buffer queue of a remote input port of a remote computing device communicatively coupled to the corresponding output port;

determine, for each output port, a total congestion value as a function of the local congestion value and the remote congestion value; and enqueue the network packet into one of the plurality of output buffer queues of one of the plurality of output ports based on the total congestion values of the plurality of output ports.

2. The network switch of claim 1, wherein to determine the local congestion value comprises to perform a lookup on a translation table, wherein the translation table maps maximum local occupancy counts to corresponding local congestion values.

3. The network switch of claim 1, wherein to determine the remote congestion value comprises to perform a lookup on a translation table based on a number of queued elements presently queued in the corresponding remote input buffer queue of the remote input port, wherein the translation table maps remote congestion values to values of the number of queued elements to corresponding remote congestion values.

4. The network switch of claim 3, wherein the pipeline logic unit is further to track the number of queued elements presently in each of the remote input buffer queues, wherein to track the number of queued elements presently in each of the remote input buffer queues comprises to (i) increment, for each input buffer queue of each input port, a corresponding queued element counter associated with a corresponding input buffer queue in response to having transmitted an element from a corresponding output buffer queue communicatively coupled to the corresponding input buffer queue and (ii) decrement, for each input buffer queue of each input port, the corresponding queued element counter upon in response to having received an acknowledgement from the corresponding input buffer queue that a previously queued element in the corresponding input buffer queue has been dequeued.

5. The network switch of claim 1, wherein to enqueue the network packet into the one of the plurality of output buffer queues of the one of the plurality of output ports comprises to enqueue the network packet based on which of the plurality of output ports has a lowest total congestion value.

6. The network switch of claim 1, wherein to determine the total congestion value for each output port comprises to determine the total congestion value as a function of the greater of the local congestion value and the remote congestion value.

7. The network switch of claim 1, wherein to determine the total congestion value for each output port comprises to determine the total congestion value as a function of a root mean square of the local congestion value and the remote congestion value.

8. One or more non-transitory, computer-readable storage media comprising a plurality of instructions stored thereon that in response to being executed cause a network switch to:

detect, for each output port of a plurality of output ports of the network switch, an occupancy count for each of a plurality of output buffer queues of a corresponding output port, wherein each occupancy count defines a present number of elements in the corresponding output buffer queue, determine, for each output port, a maximum local occupancy count based on the determined occupancy counts of the output buffer queues of the corresponding output port, and determine, for each output port, a local congestion value based on the maximum local occupancy count of the corresponding output port;

determine, for each output port, a remote congestion value for a corresponding remote input buffer queue of a remote input port of a remote computing device communicatively coupled to the corresponding output port;

an output port selection circuit to determine, for each output port, a total congestion value as a function of the local congestion value and the remote congestion value; and enqueue the network packet into one of the plurality of output buffer queues of one of the plurality of output ports based on the total congestion values of the plurality of output ports.

9. The one or more non-transitory, computer-readable storage media of claim 8, wherein to determine the local congestion value comprises to perform a lookup on a translation table, wherein the translation table maps maximum local occupancy counts to corresponding local congestion values.

10. The one or more non-transitory, computer-readable storage media of claim 8, wherein to determine the remote congestion value comprises to perform a lookup on a translation table based on a number of queued elements presently queued in the corresponding remote input buffer queue of the remote input port, wherein the translation table maps remote congestion values to values of the number of queued elements to corresponding remote congestion values.

11. The one or more non-transitory, computer-readable storage media of claim 10, wherein the plurality of instructions further cause the network switch to track the number of queued elements presently in each of the remote input buffer queues, and wherein to track the number of queued elements presently in each of the remote input buffer queues comprises to (i) increment, for each input buffer queue of each input port, a corresponding queued element counter associated with a corresponding input buffer queue in response to having transmitted an element from a corresponding output buffer queue communicatively coupled to the corresponding input buffer queue and (ii) decrement, for each input buffer queue of each input port, the corresponding queued element counter upon in response to having received an acknowledgement from the corresponding input buffer queue that a previously queued element in the corresponding input buffer queue has been dequeued.

12. The one or more non-transitory, computer-readable storage media of claim 8, wherein to enqueue the network packet into the one of the plurality of output buffer queues of the one of the plurality of output ports comprises to enqueue the network packet based on which of the plurality of output ports has a lowest total congestion value.

13. The one or more non-transitory, computer-readable storage media of claim 8, wherein to determine the total congestion value for each output port comprises to determine the total congestion value as a function of the greater of the local congestion value and the remote congestion value.

14. The one or more non-transitory, computer-readable storage media of claim 8, wherein to determine the total congestion value for each output port comprises to determine the total congestion value as a function of a root mean square of the local congestion value and the remote congestion value.

15. A method for adaptive routing based on aggregated congestion information, the method comprising:

determining, by a network switch for each output port of a plurality of output ports of the network switch, an occupancy count for each of a plurality of output buffer queues of a corresponding output port, wherein each occupancy count defines a present number of elements in the corresponding output buffer queue;

determining, by the network switch for each output port, a maximum local occupancy count based on the determined occupancy counts of the output buffer queues of the corresponding output port;

determining, by the network switch for each output port, a local congestion value based on the maximum local occupancy count of the corresponding output port;

determining, by the network switch for each output port, a remote congestion value for a corresponding remote input buffer queue of a remote input port of a remote computing device communicatively coupled to the corresponding output port;

determining, by the network switch for each output port, a total congestion value as a function of the local congestion value and the remote congestion value; and enqueuing the network packet into one of the plurality of output buffer queues of one of the plurality of output ports based on the total congestion values of the plurality of output ports.

16. The method of claim 15, wherein determining the local congestion value comprises performing a lookup on a translation table, wherein the translation table maps maximum local occupancy counts to corresponding local congestion values.

17. The method of claim 15, wherein determining the remote congestion value comprises performing a lookup on a translation table based on a number of queued elements presently queued in the corresponding remote input buffer queue of the remote input port, wherein the translation table maps remote congestion values to values of the number of queued elements to corresponding remote congestion values.

18. The method of claim 17, further comprising tracking the number of queued elements presently in each of the remote input buffer queues, wherein tracking the number of queued elements presently in each of the remote input buffer queues comprises (i) incrementing, for each input buffer queue of each input port, a corresponding queued element counter associated with a corresponding input buffer queue in response to having transmitted an element from a corresponding output buffer queue communicatively coupled to the corresponding input buffer queue and (ii) decrementing, for each input buffer queue of each input port, the corresponding queued element counter upon in response to having received an acknowledgement from the corresponding input buffer queue that a previously queued element in the corresponding input buffer queue has been dequeued.

19. The method of claim 15, wherein enqueuing the network packet into the one of the plurality of output buffer queues of the one of the plurality of output ports comprises enqueuing the network packet based on which of the plurality of output ports has a lowest total congestion value.

20. The method of claim 15, wherein determining the total congestion value for each output port comprises determining the total congestion value as a function of one of (i) the greater of the local congestion value and the remote congestion value or (ii) a root mean square of the local congestion value and the remote congestion value.

21. A network switch for adaptive routing based on aggregated congestion information, the network switch comprising:

a local congestion value determination circuit to:
detect, for each of a plurality of output ports of the network switch, an occupancy count for each of a plurality of output buffer queues of a corresponding output port, wherein each occupancy count defines a present number of elements in the corresponding output buffer queue, determine, for each output port, a maximum local occupancy count based on the determined occupancy counts of the output buffer queues of the corresponding output port, and determine, for each output port, a local congestion value based on the maximum local occupancy count of the corresponding output port;

a remote occupancy count determination circuit to determine, for each output port, a remote congestion value for a corresponding remote input buffer queue of a remote input port of a remote computing device communicatively coupled to the corresponding output port;

a circuit to determine, for each output port, a total congestion value as a function of the local congestion value and the remote congestion value; and a buffer queue management circuit to enqueue the network packet into one of the plurality of output buffer queues of one of the plurality of output ports based on the total congestion values of the plurality of output ports.

22. The network switch of claim 21, wherein to determine the remote congestion value comprises to perform a lookup on a translation table based on a number of queued elements presently queued in the corresponding remote input buffer queue of the remote input port, wherein the translation table maps remote congestion values to values of the number of queued elements to corresponding remote congestion values.

23. The network switch of claim 22, wherein the remote occupancy count determination circuit is further to track the number of queued elements presently in each of the remote input buffer queues, and wherein to track the number of queued elements presently in each of the remote input buffer queues comprises to (i) increment, for each input buffer queue of each input port, a corresponding queued element counter associated with a corresponding input buffer queue in response to having transmitted an element from a corresponding output buffer queue communicatively coupled to the corresponding input buffer queue and (ii) decrement, for each input buffer queue of each input port, the corresponding queued element counter upon in response to having received an acknowledgement from the corresponding input buffer queue that a previously queued element in the corresponding input buffer queue has been dequeued.

24. The network switch of claim 21, wherein to enqueue the network packet into the one of the plurality of output buffer queues of the one of the plurality of output ports comprises to enqueue the network packet based on which of the plurality of output ports has a lowest total congestion value.

25. The network switch of claim 21, wherein the circuit to determine the total congestion value for each output port comprises a circuit to determine the total congestion value as one of (i) a function of the greater of the local congestion value and the remote congestion value or (ii) a function of a root mean square of the local congestion value and the remote congestion value.

* * * * *